Figure 1:
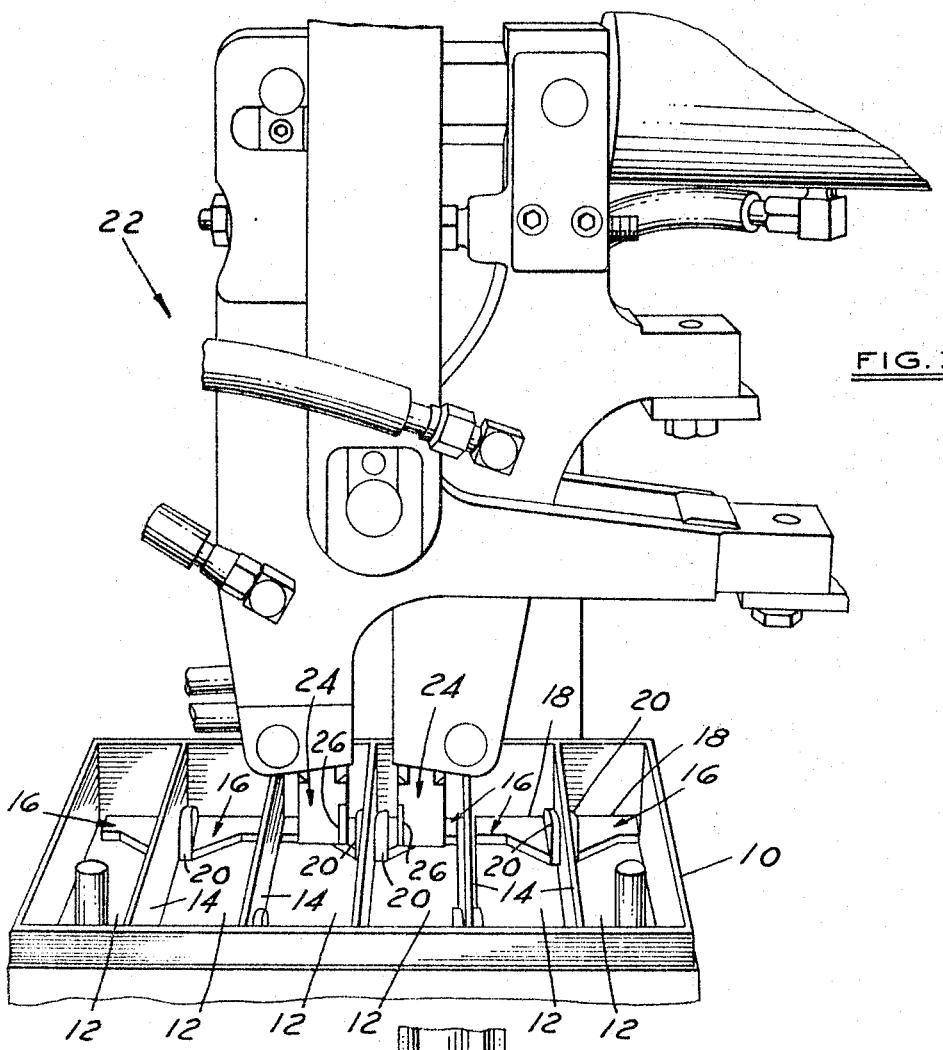
Figure 2:
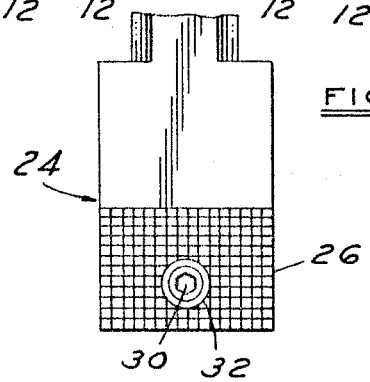

T 864,020

SN 805501

DEF. PUB.

July 29, 1969 J. W. MITCHELL, JR., ETAL

METHOD AND ELECTRODE FOR WELDING BATTERY INTERCELL CONNECTORS

Filed March 10, 1969

INVENTORS
JAMES W. MITCHELL
BENJAMIN T. BAJOREK
BY
John P. Faulkner
Glenn S. Arendsen
ATTORNEYS

T 864,020

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1406

805,501

METHOD AND ELECTRODE FOR WELDING BATTERY INTERCELL CONNECTORS

James W. Mitchell, Jr., 14114 Stahelin, Detroit, Mich. 48223, and Benjamin T. Bajorek, 23035 Marlboro, Dearborn, Mich. 48128

Filed Mar. 10, 1969. Published July 29, 1969

Int. Cl. B23k *9/28, 9/24, 11/10*

U.S. Cl. 219—91

1 Sheet Drawing. 6 Pages Specification

A welding electrode for welding the lead intercell connectors of an electrical storage battery has a serrated face to penetrate any surface dross or other impurities on the intercell connector. Typical serrations leave small pyramidal projections having a height and width of about 0.06 inch on the electrode face. The serrations also penetrate the inclined rear surface of the intercell connector to increase the contact area between the electrode and the connector. Just before and during welding, the electrodes apply a clamping force to the two parts of the intercell connector that maintains the parts in firm contact with each other. After the weld has solidified, insulated voltage

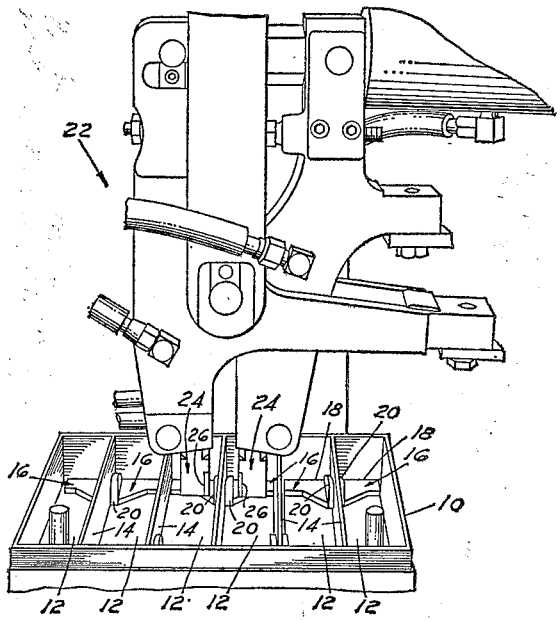

probes in the faces of the electrodes measure the voltage drop produced across the weld while the electrodes still clamp the weld together. Instantaneous values of the checking current and the resulting voltage drop are used to calculate the resistance of the weld which is monitored to insure good weld quality.